United States Patent
Walter et al.

(12) 
(10) Patent No.: US 9,844,186 B2
(45) Date of Patent: Dec. 19, 2017

(54) DRIVE LINKAGE FOR CLEANING SHOE

(71) Applicant: Deere & Company, Moline, IL (US)

(72) Inventors: Jeffrey R. Walter, Bettendorf, IA (US); David Rix, Lehi, UT (US)

(73) Assignee: DEERE & COMPANY, Moline, IL (US)

(*) Notice: Subject to any disclaimer, the term of this patent is extended or adjusted under 35 U.S.C. 154(b) by 82 days.

(21) Appl. No.: 14/869,632

(22) Filed: Sep. 29, 2015

(65) Prior Publication Data

US 2017/0086380 A1   Mar. 30, 2017

(51) Int. Cl.

| | |
|---|---|
| *A01F 12/32* | (2006.01) |
| *B07B 1/00* | (2006.01) |
| *A01F 12/44* | (2006.01) |
| *A01D 41/12* | (2006.01) |
| *F16H 25/14* | (2006.01) |
| *A01F 12/38* | (2006.01) |

(Continued)

(52) U.S. Cl.
CPC ............ *A01F 12/446* (2013.01); *A01D 41/12* (2013.01); *A01F 12/32* (2013.01); *A01F 12/38* (2013.01); *A01F 12/444* (2013.01); *A01F 12/448* (2013.01); *F16H 25/14* (2013.01); *A01D 41/02* (2013.01); *A01D 41/06* (2013.01)

(58) Field of Classification Search
CPC ...... A01F 12/448; A01F 12/446; A01F 12/44; A01F 12/32; A01F 12/56; A01D 75/282; A01D 41/12; A01D 41/1276; B06B 1/162
See application file for complete search history.

(56) References Cited

U.S. PATENT DOCUMENTS

| | | | | |
|---|---|---|---|---|
| 2,939,581 A | * | 6/1960 | Ashton | ............... A01F 12/44 209/26 |
| 4,121,472 A | * | 10/1978 | Vural | ............... B06B 1/162 192/105 A |

(Continued)

FOREIGN PATENT DOCUMENTS

| | | | | |
|---|---|---|---|---|
| CN | 202799702 U | * | 3/2013 | ............ A01D 69/06 |
| CN | 205232813 U | * | 5/2016 | ............ A01D 41/12 |

(Continued)

OTHER PUBLICATIONS

EP16188922.5 Extended European Search Report dated Feb. 22, 2017 (6 pages).

*Primary Examiner* — Arpad Fabian-Kovacs
(74) *Attorney, Agent, or Firm* — Michael Best & Friedrich LLP (57) ABSTRACT

A cleaning shoe for an agricultural machine includes a chaffer supported for movement relative to a chassis, a sieve positioned below the chaffer and supported for movement relative to the chassis. The cleaning shoe also includes a first link, a second link, and a drive shaft. The first link includes a first end and a second end coupled to the chaffer. The second link includes a first end and a second end coupled to the sieve. The drive shaft rotates about a shaft axis and includes a first cam and a second cam. The first cam is coupled to the first end of the first link, and the second cam is coupled to the first end of the second link. Rotation of the drive shaft drives the first link to reciprocate the chaffer and drives the second link to reciprocate the sieve. The second cam is angularly offset relative to the first cam by a phase angle less than 180 degrees about the shaft axis.

24 Claims, 10 Drawing Sheets

(51) Int. Cl.
*A01D 41/02* (2006.01)
*A01D 41/06* (2006.01)

(56) References Cited

U.S. PATENT DOCUMENTS

| | | | | |
|---|---|---|---|---|
| 4,557,276 A * | 12/1985 | Hyman | ............... | A01D 75/282 209/416 |
| 4,770,190 A | 9/1988 | Barnett | | |
| 6,412,260 B1 | 7/2002 | Lukac et al. | | |
| 6,458,031 B1 * | 10/2002 | Matousek | ............... | A01F 12/44 460/100 |
| 6,585,584 B2 * | 7/2003 | Buermann | ............ | A01F 12/448 460/101 |
| 6,672,957 B2 * | 1/2004 | Voss | ...................... | A01F 12/448 460/101 |
| 6,890,253 B2 * | 5/2005 | Mammen | ............ | A01F 12/448 460/101 |
| 7,029,392 B2 * | 4/2006 | Jonckheere | ........... | A01F 12/448 460/101 |
| 8,939,829 B2 * | 1/2015 | Murray | ................. | A01F 12/448 460/101 |
| 9,258,945 B2 * | 2/2016 | Pearson | ................ | A01F 12/446 |
| 2003/0186731 A1 | 10/2003 | Voss et al. | | |
| 2005/0282601 A1 * | 12/2005 | Duquesne | ............ | A01F 12/448 460/101 |
| 2008/0004092 A1 | 1/2008 | Nelson et al. | | |
| 2008/0318650 A1 * | 12/2008 | Dhont | .................. | A01D 75/282 460/101 |
| 2014/0215992 A1 | 8/2014 | Schraeder | | |
| 2015/0296712 A1 * | 10/2015 | Duquesne | ............ | A01F 12/448 460/101 |
| 2015/0305233 A1 * | 10/2015 | Surmann | ............... | A01D 34/135 56/10.1 |
| 2015/0319931 A1 * | 11/2015 | Missotten | ............. | A01F 41/12 460/101 |
| 2016/0029562 A1 * | 2/2016 | De Smet | ................. | A01F 12/32 460/1 |

FOREIGN PATENT DOCUMENTS

| | | | |
|---|---|---|---|
| CN | 105993364 A | * 10/2016 | ............. A01D 33/08 |
| CN | 205727064 U | * 11/2016 | ............. A01D 33/08 |
| EP | 2850938 | 3/2015 | |
| JP | 2010242812 A | * 10/2010 | ............. A01D 34/30 |
| WO | 2015004268 | 1/2015 | |

* cited by examiner

DRIVE LINKAGE FOR CLEANING SHOE

BACKGROUND

The present disclosure relates to agricultural harvesting machines, and particularly to a cleaning shoe for a combine harvester.

Conventional combine harvesters include a header for cutting agricultural material and a feederhouse for moving the material toward a threshing rotor. After the material is broken by the threshing rotor, the material passes to a separating mechanism that combs and separates grain from material other than grain. The grain then passes from the separating mechanism to a cleaning shoe. The cleaning shoe may include a chaffer and a sieve for further cleaning or separating the grain, particularly from lightweight chaff.

SUMMARY

In one aspect, a cleaning shoe is provided for an agricultural machine. The agricultural machine includes a chassis and a header for harvesting agricultural material. The cleaning shoe includes a chaffer, a sieve, a first link, a second link, and a drive shaft. The chaffer is configured to be supported for movement relative to the chassis. The sieve is positioned below at least a portion of the chaffer, and the sieve is configured to be supported for movement relative to the chassis. The first link includes a first end and a second end coupled to the chaffer. The second link includes a first end and a second end coupled to the sieve. The drive shaft is driven to rotate about a shaft axis. The drive shaft includes a first cam and a second cam. The first cam is coupled to the first end of the first link, and the second cam is coupled to the first end of the second link. The rotation of the drive shaft drives the first link to reciprocate the chaffer and drives the second link to reciprocate the sieve. The second cam is angularly offset relative to the first cam by a phase angle less than 180 degrees about the shaft axis.

In another aspect, an agricultural harvesting machine includes a chassis, a header for cutting and gathering agricultural material, a rotor for breaking the agricultural material, and a cleaning shoe. The cleaning shoe includes a chaffer, a sieve, a first link, a second link, a first cam, and a second cam. The chaffer is supported for movement relative to the chassis. The sieve is positioned below at least a portion of the chaffer, and the sieve is supported for movement relative to the chassis. The first link includes a first end and a second end coupled to the chaffer. The second link includes a first end and a second end coupled to the sieve. The first cam rotates about a first axis and is coupled to the first end of the first link. The rotation of the first cam drives the first link to reciprocate the chaffer. The second cam is coupled to the first end of the second link. The rotation of the second cam drives the second link to reciprocate the sieve, and the second cam is angularly offset relative to the first cam by a phase angle less than 180 degrees about the first axis.

In yet another aspect, a cleaning shoe is provided for an agricultural machine. The agricultural machine includes a chassis and a header for harvesting agricultural material. The cleaning shoe includes a chaffer, a sieve, a first link, a second link, and a drive shaft. The chaffer is configured to be supported for movement relative to the chassis. The sieve is positioned below at least a portion of the chaffer, and the sieve configured to be supported for movement relative to the chassis. The first link includes a first end and a second end coupled to the chaffer. The second link includes a first end and a second end coupled to the sieve. The drive shaft is driven to rotate about a shaft axis. The drive shaft is coupled to the first end of the first link and the first end of the second link. The rotation of the drive shaft drives the first link to move eccentrically about the shaft axis and reciprocate the chaffer, and the rotation of the drive shaft drives the second link to move eccentrically about the shaft axis and reciprocate the sieve. The eccentric movement of the second link is out of phase with the eccentric movement of the first link by a phase angle less than 180 degrees about the shaft axis.

Other aspects will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

Figure 1:
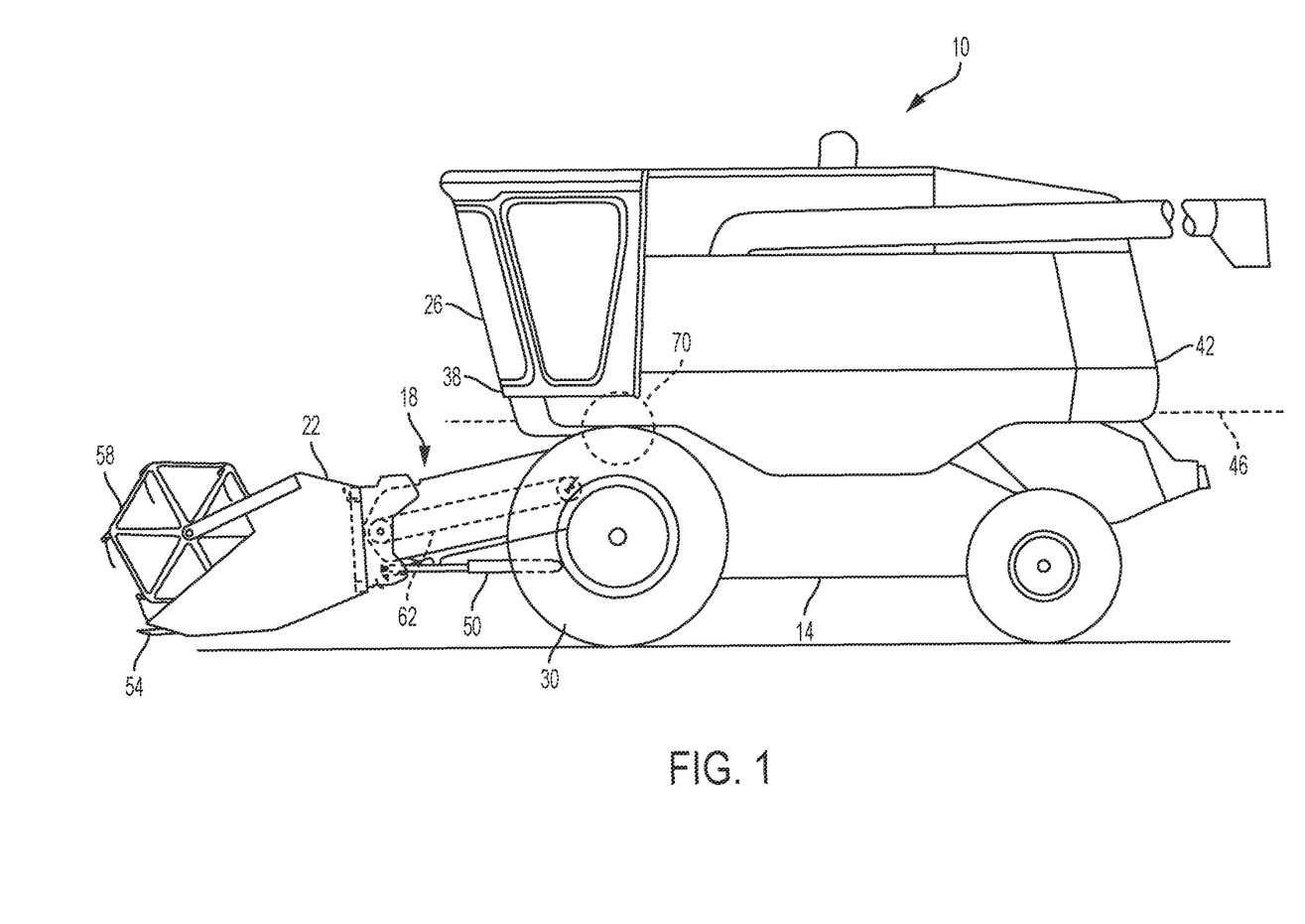
FIG. 1 is a side view of a harvester.

FIG. 1 illustrates a combine harvester 10 including a vehicle chassis or frame 14, a feeder throat or feederhouse 18, and a harvester header 22 for cutting and gathering crop plants (not shown). The frame 14 includes an operator cab 26 and traction elements 30 (e.g., wheels) for supporting and moving the vehicle frame 14 with respect to the ground. The frame 14 includes a first or forward end 38 and a second or rear end 42, and a chassis axis or frame axis 46 extends between the forward end 38 and the rear end 42. The feederhouse 18 is supported on the forward end 38 of the frame 14 and may be pivoted relative to the vehicle frame 14 by an actuator 50 (e.g., a fluid cylinder).

The header 22 is supported by the feederhouse 18 and extends transversely to the frame 14. As used herein, "transverse" generally refers to an orientation that is perpendicular to the frame axis 14 of the harvester 10 and that extends laterally between a first side of the harvester 10 and a second side of the harvester 10.

In the illustrated embodiment, the header 22 is a draper including a cutting bar 54 and rotating drum 58; in other embodiments, the header 22 may include another type of implement depending on the type of crop to be harvested. After the crop is cut by the cutting bar 54 and gathered on the header 22, it is moved along the feederhouse 18 by an elevator 62 (e.g., a conveyor) toward a threshing mechanism 70 supported on the frame 14.

Figure 2:
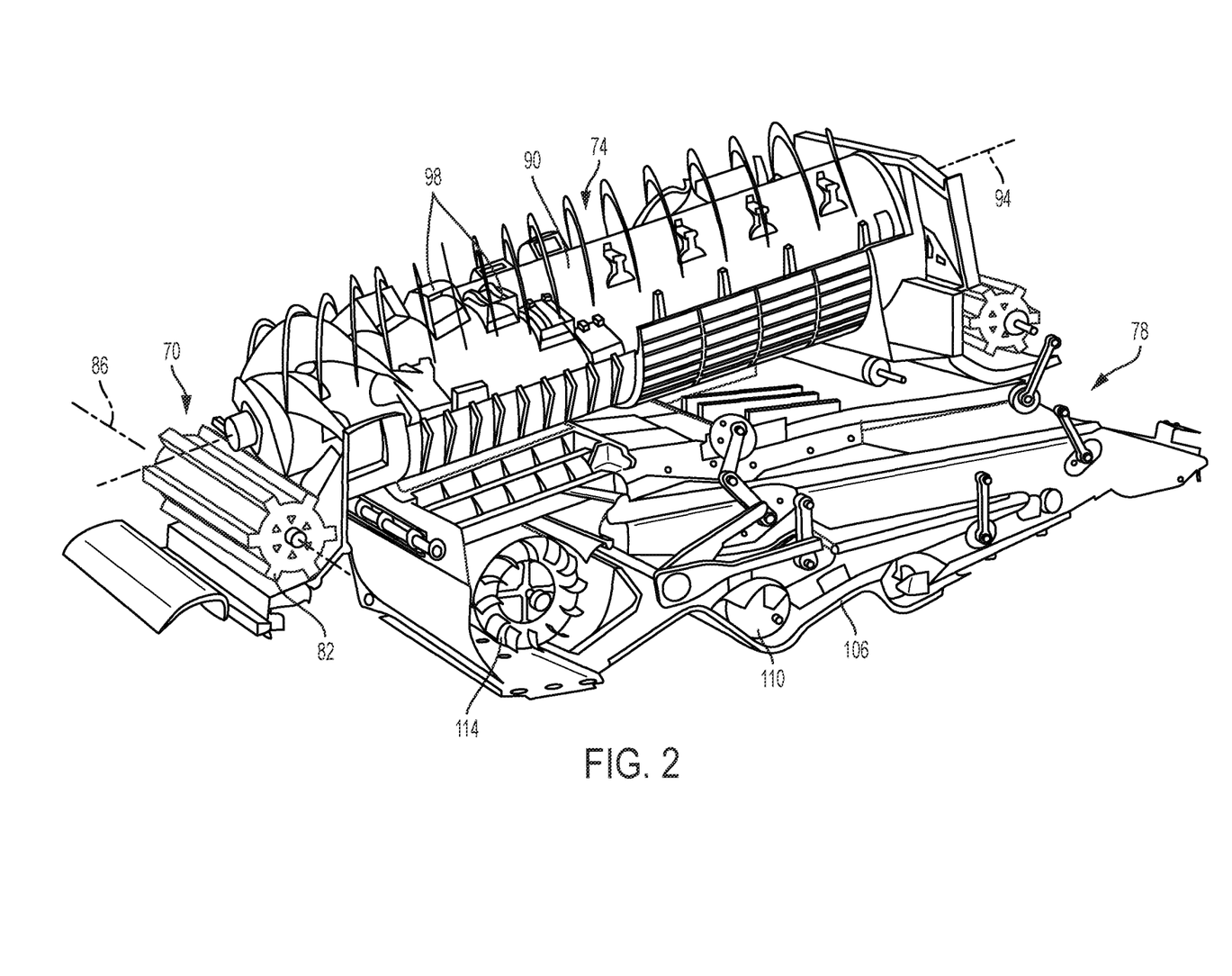
FIG. 2 is a perspective view of a threshing mechanism, a separating mechanism, and a cleaning shoe.

FIG. 2 illustrates the threshing mechanism 70, a separating mechanism 74, and a cleaning shoe 78 which are supported in an internal chamber on the frame 14. The threshing mechanism 70 includes a rotor 82 for breaking apart the crop plants. In the illustrated embodiment, the rotor 82 rotates about a rotor axis 86 oriented transverse to the frame axis 14 (FIG. 1).

After being broken apart, the crop material or crop mat passes to the separating mechanism 74. The separating mechanism 74 includes a rotating cylinder 90. The cylinder 90 rotates about a cylinder axis 94 that is oriented generally parallel to the frame axis 14 (FIG. 1) and perpendicular to the rotor axis 86. In the illustrated embodiment, the cylinder 90 includes fingers or tines 98 that engage and comb the crop material, separating the crop elements. The tines 98 may be positioned in a helical manner along an outer surface of the cylinder 90. In some embodiments, the separating mechanism 74 may include multiple rotating cylinders 90 positioned parallel to one another, and the cylinders 90 may be configured in a counter-rotating manner. In other embodiments, the separating mechanism may be constructed in a different manner.

As the grain is separated from material other than grain, the grain falls into the cleaning shoe 78. The grain that passes through the cleaning shoe 78 falls into a collector 106 positioned below the cleaning shoe 78. In the illustrated embodiment, the collector 106 includes transverse augers 110 for moving the grain toward an elevator (not shown) on a side of the harvester 10, which then conveys the grain to a grain tank (not shown). In the illustrated embodiment, a fan 114 provides air flow throughout the cleaning shoe 78 to further separate chaff from the grain. The speed of the fan 114 and the air flow can be adjusted depending on the type of grain that is harvested.

Figure 3:
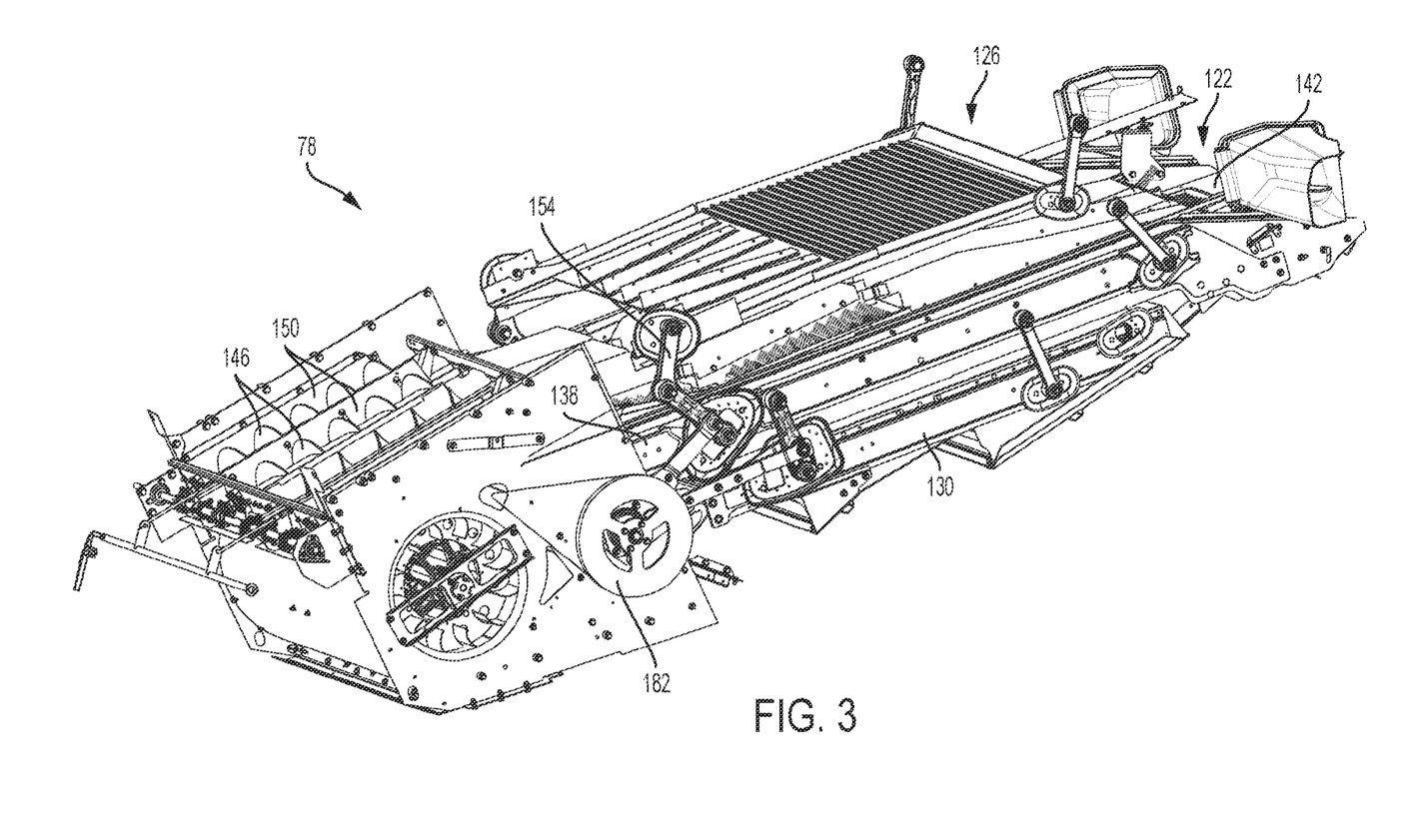
FIG. 3 is a perspective view of a cleaning shoe.

As shown in FIG. 3, the cleaning shoe 78 includes a chaffer 122, a return pan 126, and a sieve 130. The chaffer 122 includes a first end 138 positioned proximate the rotor 82 (FIG. 2) and a second end 142 positioned away from the rotor 82. The chaffer 122 is positioned below a portion of the cylinder 90 (FIG. 2). In the illustrated embodiment, the harvester 10 also includes conveyor augers 146 positioned beneath a forward portion of the rotating cylinder 90. Grain that is separated by the forward portion of the cylinder 90 falls into troughs 150, where the augers 146 convey the grain to the first end 138 of the chaffer 122. As discussed in further detail below, the chaffer 122 reciprocates, thereby causing chaff on the chaffer 122 to move toward the second end 142.

The return pan 126 is positioned above a portion of the chaffer 122 proximate the second end 142. The return pan 126 is also supported for reciprocating movement, and is linked to the chaffer 122 by a connecting arm 154. The return pan 126 collects grain from a rear portion of the cylinder 90 (FIG. 2) and deposits it onto the first end 138 of the chaffer 122.

Figure 4:
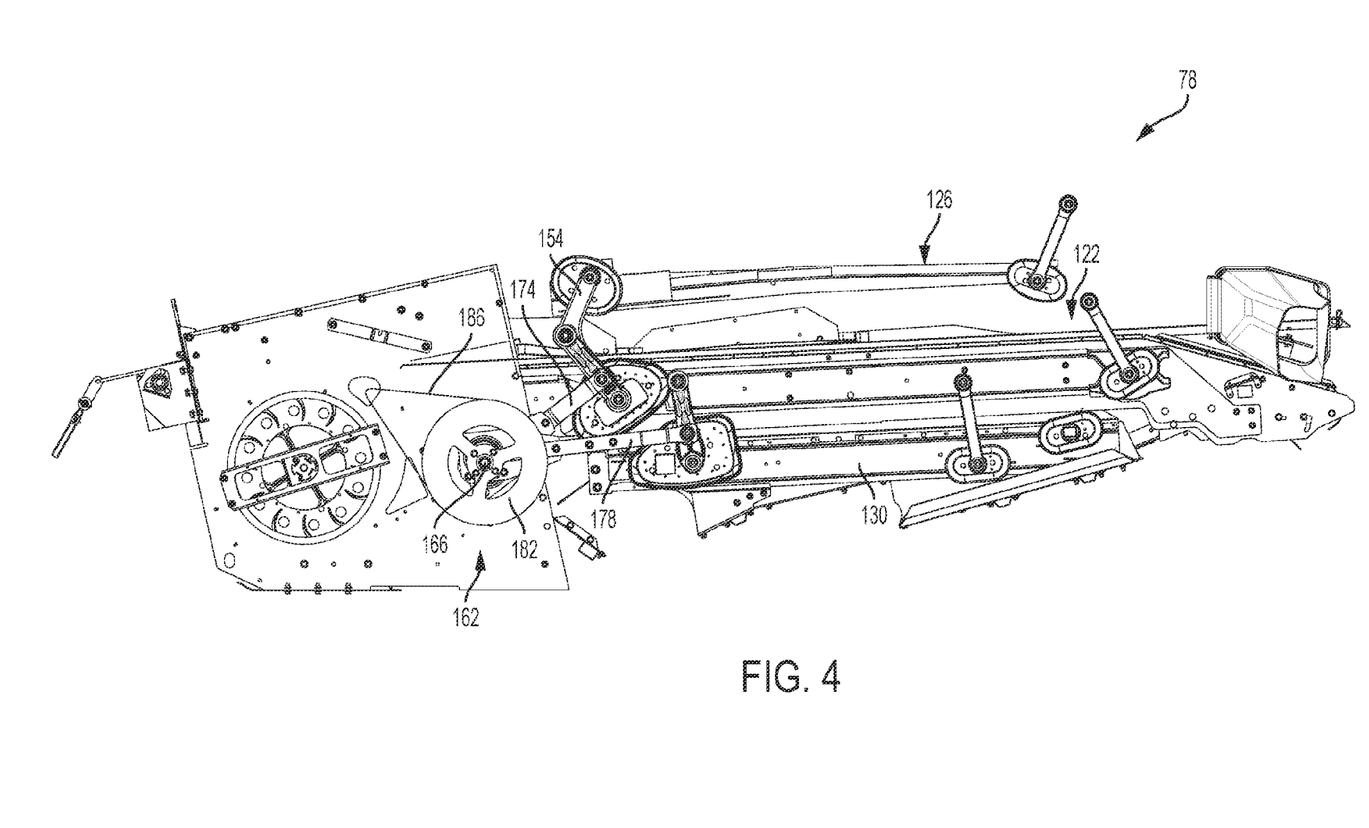
FIG. 4 is a side view of the cleaning shoe of FIG. 3.

Referring to FIG. 4, the sieve 130 is positioned below the chaffer 122. The sieve 130 reciprocates independently of the chaffer 122. The chaffer 122 and the sieve 130 each include louvers or slots (not shown) through which grain passes. The slots can be selectively opened and closed depending on the type and size of grain that is being harvested. The grain passing through the slots falls into the collector 146 (FIG. 2).

Figure 5:
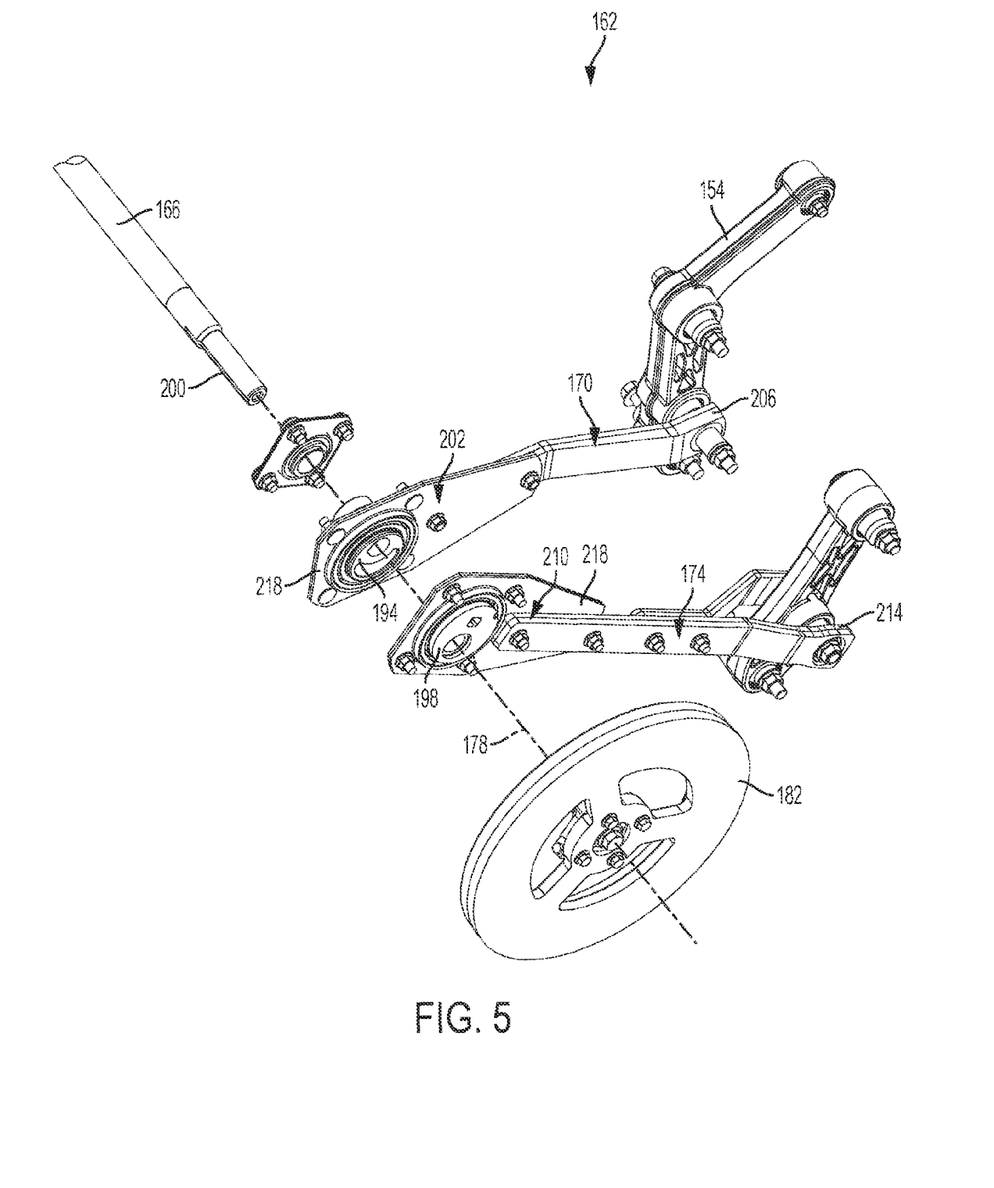
FIG. 5 is an exploded view of a drive mechanism for the cleaning shoe of FIG. 3.

As shown in FIGS. 4 and 5, the shoe 78 further includes a drive system 162 for reciprocating the chaffer 122 and sieve 130. The drive system 162 includes a drive shaft 166, a first link or chaffer link 170, and a second link or sieve link 174. The drive shaft 166 rotates about a shaft axis 178 (FIG. 5). In the illustrated embodiment, the drive system 162 also includes a pulley or sheave 182 coupled to the drive shaft 166 and a belt 186 (FIG. 4) wrapped around a portion of the sheave 182. The belt 186 may be driven by a motor (not shown) to rotate the sheave 182 and the shaft 166. In other embodiments, another type of drive system may be used. In one embodiment, the sheave 182 acts as an inertial damper or flywheel.

As shown in FIG. 5, the drive system 162 also includes a first cam or chaffer cam 194 eccentrically coupled to the shaft 166 and a second cam or sieve cam 198 eccentrically coupled to the shaft 166. In the illustrated embodiment, each cam 194, 198 is secured against rotation relative to the shaft 166 by a key 200 formed on the shaft 166. The chaffer link 170 includes a first end 202 coupled to the chaffer cam 194 and a second end 206 coupled to the connecting arm 154, which is in turn coupled to the return pan 126 and the chaffer 122 (FIG. 4). The sieve link 174 includes a first end 210 coupled to the sieve cam 198 and a second end 214 coupled to the sieve 130 (FIG. 4). In the illustrated embodiment, the chaffer link 170 and sieve link 174 are each formed as Pitman arms. The first ends 202, 210 each include flanges 218 that extend around the respective cams 194, 198. Although one side of the drive system 162 is shown in FIGS. 4 and 5, it is understood that another chaffer link 170, another sieve link 174, similar cams 194, 198, and/or an additional sheave/flywheel may be provided on the opposite end of the drive shaft 166.

Figure 6:
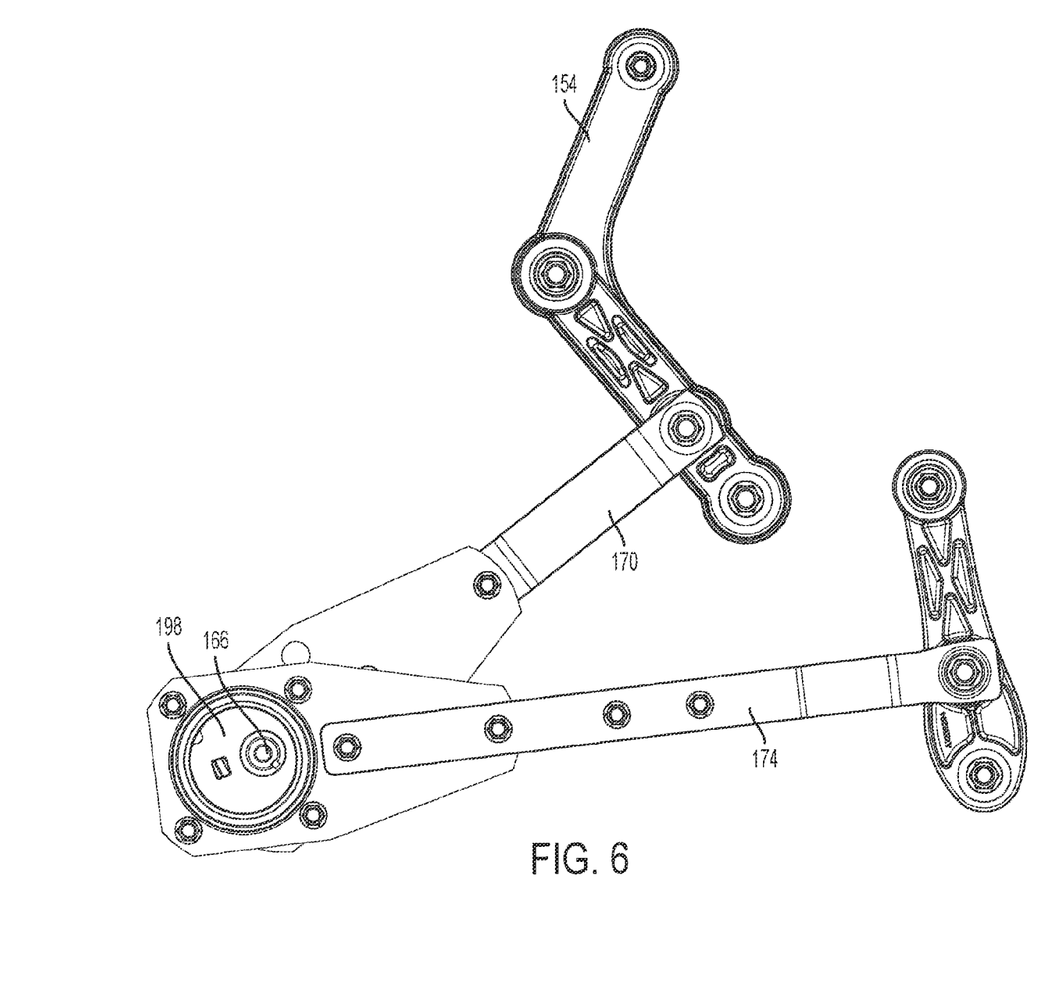
FIG. 6 is a side view of the drive mechanism of FIG. 5 in a first position.
Figure 7:
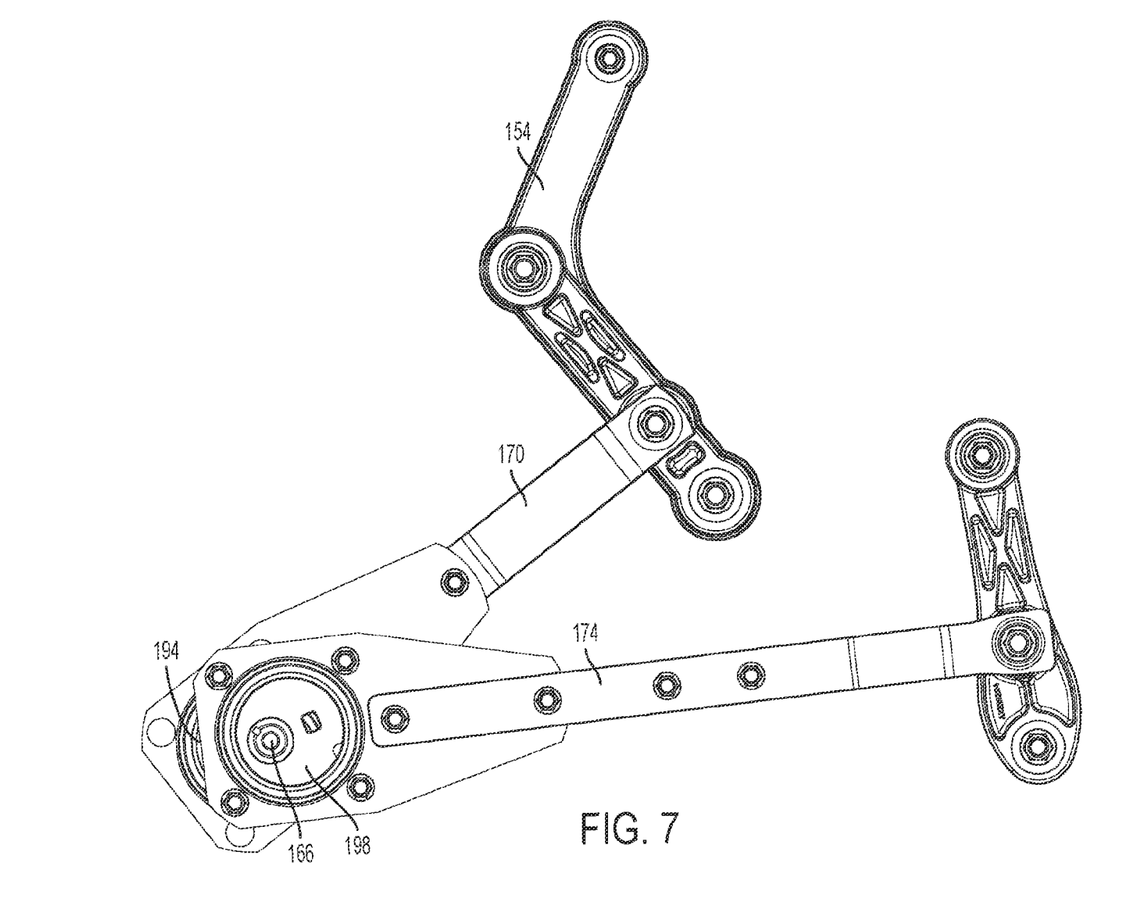
FIG. 7 is a side view of the drive mechanism of FIG. 5 in a second position.

FIGS. 6 and 7 illustrate the cams 194, 198 and the links 170, 174 at different positions during rotation of the drive shaft 166. As the drive shaft 166 rotates, the rotation of the chaffer cam 194 causes the chaffer link 170 to reciprocate relative to the drive shaft 166, which in turn reciprocates the chaffer 122 (FIG. 4). In the illustrated embodiment, the return pan 126 is coupled to the chaffer 122 by the connecting arm 154 and reciprocates with the chaffer 122. Similarly, the sieve cam 198 causes the sieve link 174 to reciprocate relative to the drive shaft 166, thereby reciprocating the sieve 130 (FIG. 4). In other embodiments, the drive system 162 may include a different mechanism (i.e., other than a cam) for eccentrically driving the first ends 202, 210 of the chaffer link 170 and the sieve link 174 about the shaft axis 178.

Figure 8:
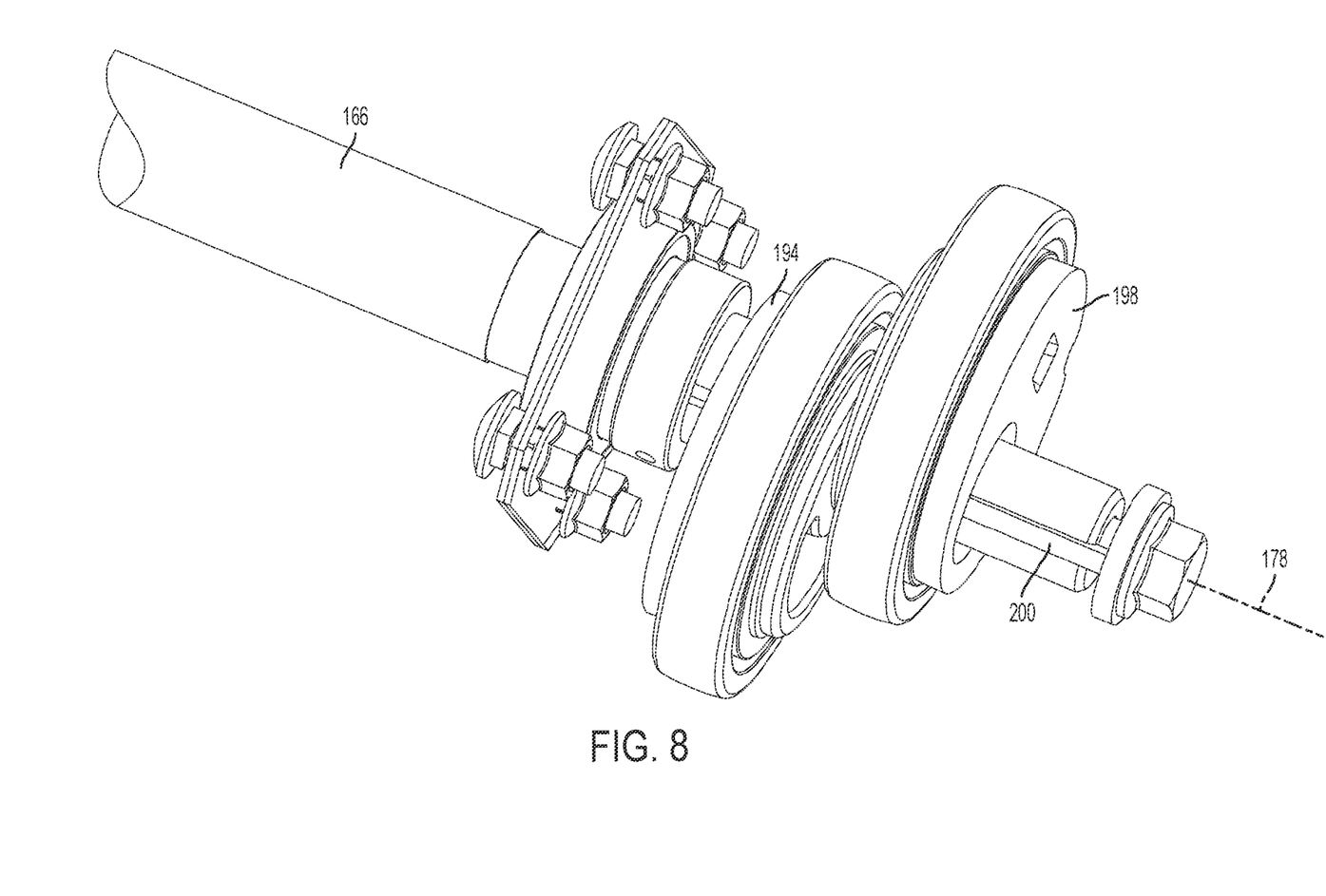
FIG. 8 is a perspective view of a drive shaft, a chaffer cam, and a sieve cam.
Figure 9:
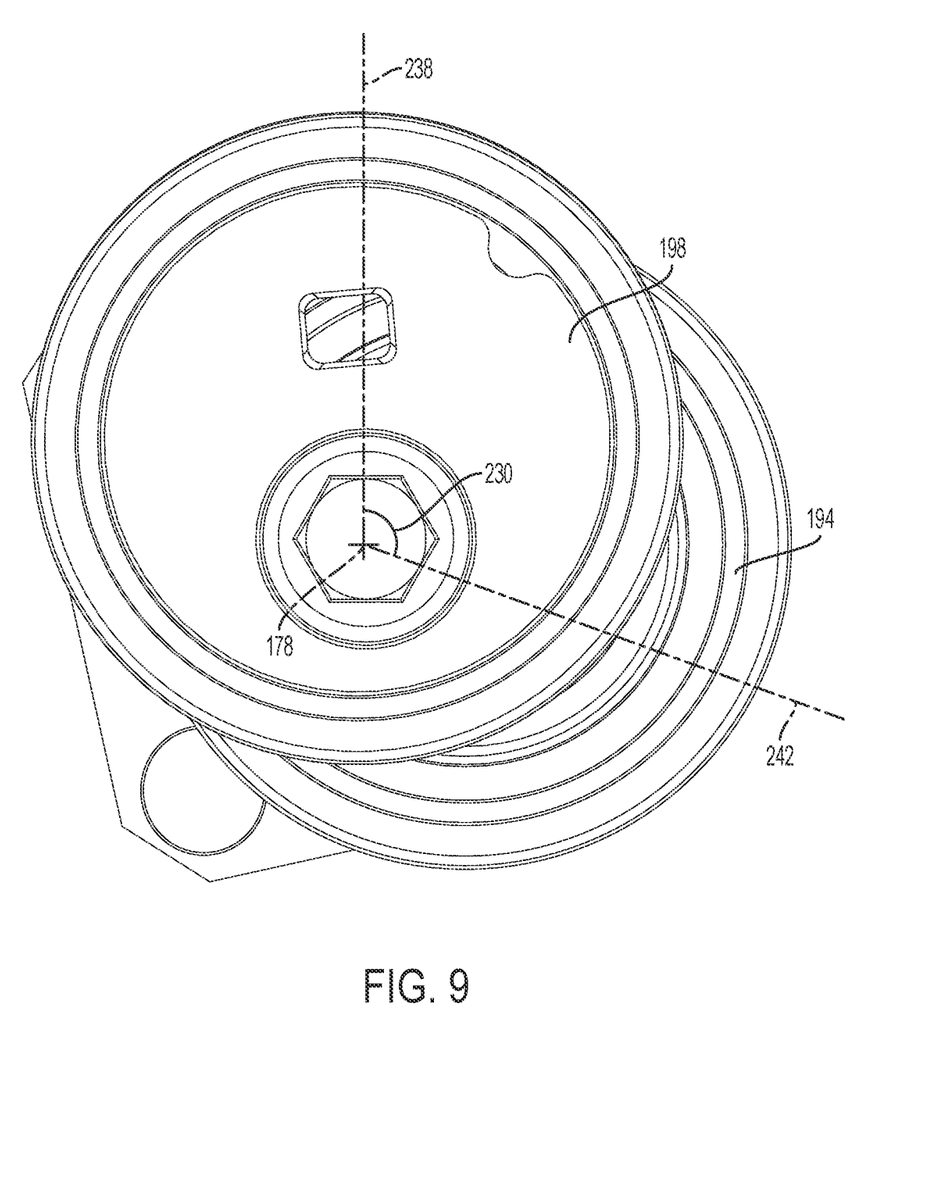
FIG. 9 is an end view of the drive shaft, the chaffer cam, and the sieve cam as shown in FIG. 8.

As shown in FIGS. 8 and 9, the chaffer cam 194 and the sieve cam 198 are angularly offset from one another with respect to the shaft axis 178 by a phase angle 230 (FIG. 9). Stated another way, as shown in FIG. 9, a first reference line 238 extends between the shaft axis 178 and a point on the chaffer cam 194 that is furthest from the shaft axis 178, and a second reference line 242 extends between the shaft axis 178 and a point on the sieve cam 198 that is furthest from the shaft axis 198. The phase angle 230 is defined as the angle between the first reference line 238 and the second reference line 242. The phase angle 230 provides a phase difference between the reciprocation of the chaffer link 170 and the reciprocation of the sieve link 174. The motions of the chaffer link 170 and the sieve link 174 are out of phase relative to each other, thereby causing the motions of the chaffer 122 and the sieve 130 (FIG. 4) to be out of phase relative to one another.

In one embodiment, the phase angle 230 (i.e., the phase difference between the reciprocation of the chaffer link 170 and the reciprocation of the sieve link 174) is less than 180 degrees. In another embodiment, the phase angle 230 is less than 170 degrees. In another embodiment, the phase angle 230 is less than 160 degrees. In another embodiment, the phase angle 230 is less than 150 degrees. In another embodiment, the phase angle 230 is less than 140 degrees. In another embodiment, the phase angle 230 is less than 130 degrees. In another embodiment, the phase angle 230 is less than 120 degrees. In another embodiment, the phase angle 230 is less than 110 degrees. In another embodiment, the phase angle 230 is less than 100 degrees. In another embodiment, the phase angle 230 is less than 90 degrees. In another embodiment, the phase angle 230 is less than 80 degrees. In another embodiment, the phase angle 230 is less than 70 degrees. In another embodiment, the phase angle 230 is less than 60 degrees. In another embodiment, the phase angle 230 is less than 50 degrees. In another embodiment, the phase angle 230 is less than 40 degrees. In another embodiment, the phase angle 230 is less than 30 degrees. In another embodiment, the phase angle 230 is less than 20 degrees. In another embodiment, the phase angle 230 is less than 10 degrees.

In another embodiment, the phase angle 230 is between about 180 degrees and about 90 degrees. In another embodiment, the phase angle 230 is between about 170 degrees and about 90 degrees. In another embodiment, the phase angle 230 is between about 160 degrees and about 90 degrees. In another embodiment, the phase angle 230 is between about 150 degrees and about 90 degrees. In another embodiment, the phase angle 230 is between about 140 degrees and about 90 degrees. In another embodiment, the phase angle 230 is between about 130 degrees and about 90 degrees. In another embodiment, the phase angle 230 is between about 120 degrees and about 90 degrees. In another embodiment, the phase angle 230 is between about 110 degrees and about 90 degrees. In another embodiment, the phase angle 230 is between about 100 degrees and about 90 degrees.

In another embodiment, the phase angle 230 is between about 180 degrees and about 100 degrees. In another embodiment, the phase angle 230 is between about 180 degrees and about 110 degrees. In another embodiment, the phase angle 230 is between about 180 degrees and about 120 degrees. In another embodiment, the phase angle 230 is between about 180 degrees and about 130 degrees. In another embodiment, the phase angle 230 is between about 180 degrees and about 140 degrees. In another embodiment, the phase angle 230 is between about 180 degrees and about 150 degrees. In another embodiment, the phase angle 230 is between about 180 degrees and about 160 degrees. In another embodiment, the phase angle 230 is between about 180 degrees and about 170 degrees.

In one embodiment, the phase angle 230 is approximately 108 degrees. By offsetting the cams 194, 198 and configuring the links 170, 174 to reciprocate out of phase with one another, the forces and vibrations transmitted through the links 170, 174 cancel each other out to a significant extent. In addition, the variations in loads and speeds can be reduced to a significant extent.

In one embodiment, a drive shaft 166 including cams 194, 198 having a phase angle 230 of approximately 108 degrees experiences a variation in drive shaft speed of approximately 30 rpm. A variation in the displacement of the belt 186 driving the drive shaft 166 is approximately 3.25 mm, and a variation in the power required to drive the shaft 166 is approximately 5.6 kW. For purposes of comparison, these results are reviewed against a conventional cleaning shoe including a drive shaft with cams having a phase angle of approximately 180 degrees. In one embodiment, the conventional drive shaft experienced a variation between its minimum and maximum rotational speed of approximately 59 rpm. In addition, the belt of the conventional drive shaft experienced a variation in its belt displacement of approximately 8.3 mm, and the variation in the power required to drive the shaft was approximately 8 kW. A drive system 162 including cams 194, 198 defining a phase angle 230 less than 180 degrees significantly reduces the variation in the shaft speed, belt displacement, and power requirement.

The masses that are driven by the chaffer link 170 (e.g., the chaffer 122 and the return pan 126) may be different from the masses that are driven by the sieve link 174 (e.g., the sieve 130). In addition, the stroke and path of movement for each driven element may be different. Due to these differences, the force and speed variations exerted on each link 174, 178 are unequal. Conventional cleaning shoe designs may attempt to smooth these variations by including a flywheel coupled to the drive shaft or by providing a hydraulic motor for driving the drive shaft. However, these solutions add significant weight to the cleaning shoe and the harvester in general. By timing the reciprocation of each link 174, 178 at a phase angle 230 less than 180 degrees, the drive system 162 can minimize the effects of differences in mass, stroke, and movement of the chaffer link 170 and the sieve link 174. In addition, this timing relationship may reduce the load and speed variations experienced by the chaffer 122, the sieve 130, the drive shaft 166, and the components that rotate the drive shaft 166 (e.g., the belt 186) without adding significant weight. This provides a smoother and more efficient operation, reducing wear on these components and extending their working lives.

Figure 10:
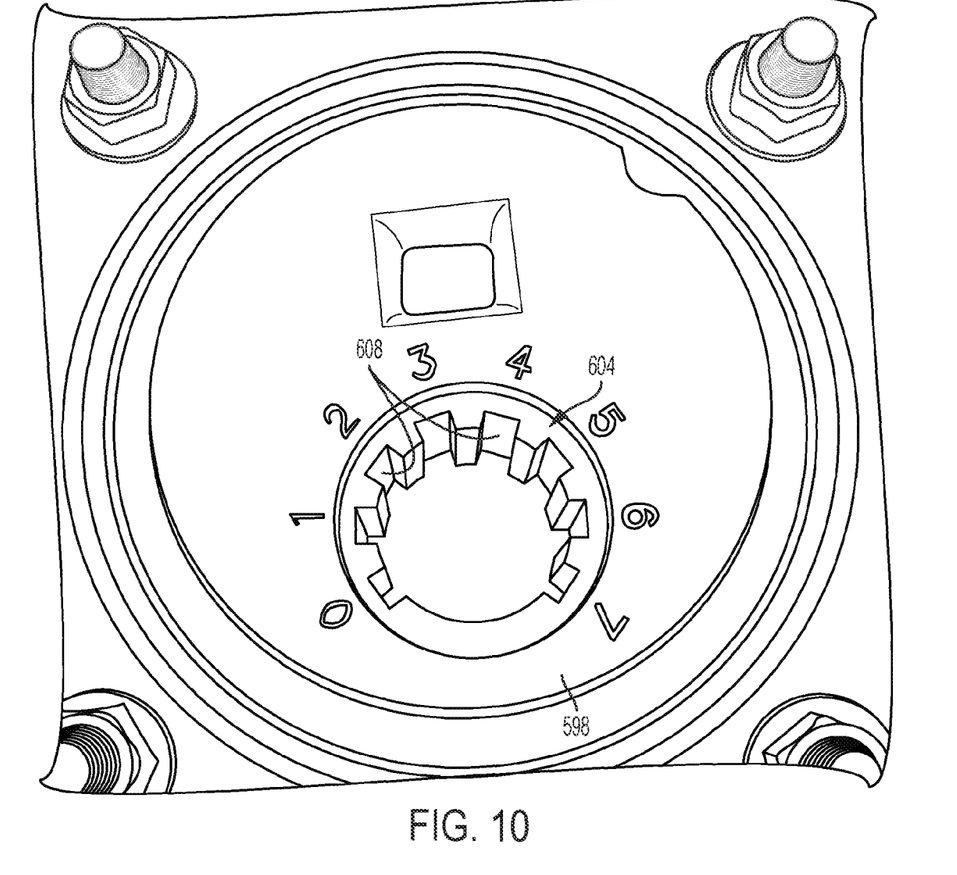
FIG. 10 is a side view of a sieve cam according to another embodiment.

FIG. 10 illustrates another embodiment of the sieve cam 598. The sieve cam 598 includes an internal spline surface 604 with multiple key slots 608. Each key slot 608 may be sized to receive a corresponding key 200 (FIGS. 5 and 8) formed on the drive shaft 166. The sieve cam 598 can be coupled to the drive shaft 166 in multiple positions about the shaft axis 178, thereby changing the phase angle 230 (FIG. 9) between the sieve cam 598 and the chaffer cam 194. This allows an operator to adjust the timing relationship between the reciprocating motion of the components of the cleaning shoe 78 for a specific application. In other embodiments, the chaffer cam 194 may be formed with multiple key slots either instead of or in addition to the sieve cam 598.

Although certain aspects have been described in detail with reference to certain preferred embodiments, variations and modifications exist within the scope and spirit of one or more independent aspects as described. Various features and advantages are set forth in the following claims.

What is claimed is:

1. A cleaning shoe for an agricultural machine, the agricultural machine including a chassis and a header for harvesting agricultural material, the cleaning shoe comprising:
 a chaffer configured to be supported for movement relative to the chassis;
 a sieve positioned below at least a portion of the chaffer, the sieve configured to be supported for movement relative to the chassis;
 a first link including a first end and a second end coupled to the chaffer;
 a second link including a first end and a second end coupled to the sieve; and
 a drive shaft driven to rotate about a shaft axis, the drive shaft including a first cam and a second cam, the first cam coupled to the first end of the first link, the second cam coupled to the first end of the second link, the rotation of the drive shaft driving the first link to reciprocate the chaffer and driving the second link to reciprocate the sieve, the second cam angularly offset relative to the first cam by a phase angle less than 180 degrees about the shaft axis.

2. The cleaning shoe of claim 1, wherein the first link is a Pitman arm and the second link is a Pitman arm.

3. The cleaning shoe of claim 1, further comprising a sheave coupled to the drive shaft and a belt wrapped around at least a portion of the sheave, wherein the sheave and the drive shaft are driven to rotate by the belt.

4. The cleaning shoe of claim 1, wherein the drive shaft includes a key and at least one of the first cam and the second cam includes a plurality of slots, the key being selectively positioned in one of the plurality of slots to secure the at least one cam against rotation relative to the drive shaft.

5. The cleaning shoe of claim 1, wherein the phase angle is between approximately 160 degrees and approximately 100 degrees.

6. The cleaning shoe of claim 1, wherein the phase angle is between zero degrees and 170 degrees.

7. The cleaning shoe of claim 6, wherein the phase angle is between zero degrees and 110 degrees.

8. The cleaning shoe of claim 7, wherein the phase angle is approximately 108 degrees.

9. An agricultural harvesting machine comprising:
a chassis;
a header for cutting and gathering agricultural material;
a rotor for breaking the agricultural material; and
a cleaning shoe including,
    a chaffer supported for movement relative to the chassis,
    a sieve positioned below at least a portion of the chaffer, the sieve supported for movement relative to the chassis,
    a first link including a first end and a second end coupled to the chaffer,
    a second link including a first end and a second end coupled to the sieve,
    a first cam rotating about a first axis and coupled to the first end of the first link, the rotation of the first cam driving the first link to reciprocate the chaffer, and
    a second cam coupled to the first end of the second link, the rotation of the second cam driving the second link to reciprocate the sieve, the second cam angularly offset relative to the first cam by a phase angle less than 180 degrees about the first axis.

10. The agricultural harvesting machine of claim 9, wherein the first link is a Pitman arm and the second link is a Pitman arm.

11. The agricultural harvesting machine of claim 9, further comprising a drive shaft including a key, wherein at least one of the first cam and the second cam includes a plurality of slots, the key being selectively positioned in one of the plurality of slots to secure the at least one cam against rotation relative to the drive shaft.

12. The agricultural harvesting machine of claim 9, further comprising a drive shaft driven to rotate about the first axis, wherein the first cam and the second cam are coupled to the drive shaft such that the first cam and the second cam both rotate about the first axis.

13. The agricultural harvesting machine of claim 9, wherein the phase angle is between approximately 160 degrees and approximately 100 degrees.

14. The agricultural harvesting machine of claim 9, wherein the phase angle is between zero degrees and 170 degrees.

15. The agricultural harvesting machine of claim 14, wherein the phase angle is between zero degrees and 110 degrees.

16. The agricultural harvesting machine of claim 15, wherein the phase angle is approximately 108 degrees.

17. A cleaning shoe for an agricultural machine, the agricultural machine including a chassis and a header for harvesting agricultural material, the cleaning shoe comprising:
a chaffer configured to be supported for movement relative to the chassis;
a sieve positioned below at least a portion of the chaffer, the sieve configured to be supported for movement relative to the chassis;
a first link including a first end and a second end coupled to the chaffer;
a second link including a first end and a second end coupled to the sieve; and
a drive shaft rotating about a shaft axis, the drive shaft coupled to the first end of the first link and the first end of the second link, the rotation of the drive shaft driving the first link to move eccentrically about the shaft axis and reciprocate the chaffer, the rotation of the drive shaft driving the second link to move eccentrically about the shaft axis and reciprocate the sieve, the eccentric movement of the second link being out of phase with the eccentric movement of the first link by a phase angle less than 180 degrees about the shaft axis.

18. The cleaning shoe of claim 17, wherein the drive shaft includes a first cam and a second cam, the first cam coupled to the first end of the first link, the second cam coupled to the first end of the second link, the phase angle defined by an angular offset between the first cam and the second cam.

19. The cleaning shoe of claim 17, further comprising a sheave coupled to the drive shaft and a belt wrapped around at least a portion of the sheave, wherein the sheave and the drive shaft are driven to rotate by the belt.

20. The cleaning shoe of claim 17, wherein the first link is a Pitman arm and the second link is a Pitman arm.

21. The cleaning shoe of claim 17, wherein the phase angle is between approximately 160 degrees and approximately 100 degrees.

22. The cleaning shoe of claim 17, wherein the phase angle is between zero degrees and 170 degrees.

23. The cleaning shoe of claim 22, wherein the phase angle is between zero degrees and 110 degrees.

24. The cleaning shoe of claim 23, wherein the phase angle is approximately 108 degrees.

* * * * *